UNITED STATES PATENT OFFICE 2,033,949

ORGANIC FLUORINE COMPOUNDS

Herbert August Lubs and Arthur Lawrence Fox, Wilmington, Del., assignors to E. I. du Pont de Nemours & Company, Wilmington, Del., a corporation of Delaware No Drawing. Application January 12, 1933, Serial No. 651,352

7 Claims. (Cl. 260—44)

This invention relates to the manufacture of new chemical compounds useful as intermediates in the production of new dyestuffs and other products of a useful nature.

Amino-arylthiazoles are well known compounds which are useful in the manufacture of dyestuffs and for other purposes.

An object of the present invention is to provide new substituted amino-benzothiazoles and more particularly amino-benzothiazole having a fluorine atom substituted for a hydrogen of the benzene nucleus. Further objects are to provide new compositions of matter and to advance the art. Other objects will appear hereinafter.

These objects are accomplished according to our invention by reacting, in a suitable solvent or suspending medium, para-fluoro-phenyl-thioureas with sulfuryl chloride, bromine, chlorine, mixtures of halogens with sulfuryl chloride, sulfur chloride or other compounds which would liberate bromine or chlorine or mixtures thereof, whereby, 1-amino-5-fluoro-benzothiazoles are obtained. Other known methods of closing the ring may be employed.

The 1-amino-5-fluoro-benzothiazoles may be represented by the formula

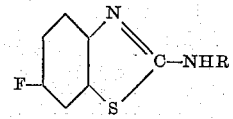

in which R may represent hydrogen, alkyl or a substituted or unsubstituted aryl nucleus. Among the compounds which we have found to be particularly valuable are the following:

1-amino-5-fluoro-benzothiazole

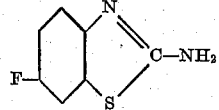

1(phenyl) amino-5-fluoro-benzothiazole

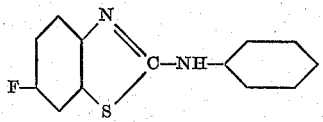

These compounds may be prepared by reacting the appropriate fluoro-phenyl thiourea with sulfuryl chloride or the like, for example, the two compounds specifically mentioned above may be prepared respectively from the following thioureas:

p-fluoro-phenyl thiourea

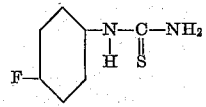

phenyl-p-fluoro-phenyl-thiourea

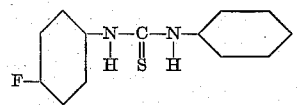

This reaction should generally be carried out in a suitable solvent or suspending medium with which the reagents are less reactive than with each other. Some of the solvent and suspending media which we have found to be satisfactory for our purpose are chlorobenzene, dichlorobenzene, ethylene dichloride, chloroform and the like.

If desired, 1-amino-5-fluoro-benzothiazoles may be prepared having one of the amino hydrogens substituted by any other desired organic compound such as, alkyl, aryl and aralkyl radicals, by treating with sulfuryl chloride or the like, a fluoro-phenyl-thiourea having the formula

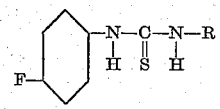

wherein R represents the desired alkyl, aryl or aralkyl radical. When R in the above formula represents an aryl group, the product formed by treating with sulfuryl chloride will generally be a thiazole having both the nitrogen and sulfur atoms connected to the benzene nucleus containing the fluorine atom with some amounts of the compound formed with the nitrogen and sulfur connected to the other aryl nucleus.

The fluoro-phenyl thioureas may be prepared by reacting a fluorinated amine of the benzene series such as, for example, para-fluoro-aniline with a suitable thiocyanate such as, for instance, an alkali metal thiocyanate or with an alkyl-isothiocyanate, an aryl-iso-thiocyanate or carbon disulfide. The thioureas may be of the symmetrical or unsymmetrical type, for instance, para-fluoro-phenyl-thiourea being unsymmetrical and para:para' - difluoro - diphenyl - thiourea being symmetrical. Any of the thioureas thus prepared may be treated in accordance with the process of the present invention. Among such compounds may be mentioned as additional examples those of the general formula

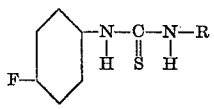

in which R represents methyl, ethyl, butyl, naphthyl or an aromatic radical of the benzene series containing alkyl, alkoxy and halogen substituents. The production of compounds of this type is disclosed in our co-pending application Serial No. 630,248 filed August 26, 1932.

In order to more clearly illustrate a method for preparing the new compounds of our invention the following example is given:

Example 34 grams of p-fluoro-phenyl-thiourea were mixed with 120 cc. of chlorobenzene. To this mixture was slowly added, from a dropping funnel, the following mixture:

15 cc. sulfuryl chloride
2.6 cc. bromine
60 cc. chlorobenzene

Vigorous stirring was maintained during this addition and large volumes of hydrohalide gas were given off. When the reaction was complete, the product was filtered off and dissolved in water. The water solution was then treated with bone black, filtered, cooled, and the free base precipitated by adding ammonia. The yield of the crude hydrohalide was 31 grams. The yield of the free base was over 16 grams. The 1-amino-5-fluoro-benzothiazole melted between 181 and 182° C.

The other thiazoles of our invention may be prepared according to the same method. Other methods for preparing our new compounds will be readily apparent to those skilled in the art.

While we have disclosed certain specific members of our new class of compounds, many other compounds falling within the class will be readily apparent to those skilled in the art without departing from the spirit of our invention. Accordingly, the scope of our invention is to be limited solely by the appended claims construed as broadly as is permissible in view of the prior art.

We claim:

1. The 1-amino-5-fluoro-benzothiazole.
2. The compound 1-(phenyl)-amino-5-fluoro-benzothiazole.
3. A new class of compounds represented by the formula:

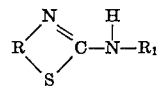

wherein R represents a benzene nucleus having a fluorine atom substituted for hydrogen in the position para to the nitrogen atom, and R₁ represents hydrogen or a hydrocarbon radical.

4. A new class of compounds represented by the formula:

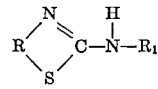

wherein R represents a benzene nucleus having a fluorine atom substituted for hydrogen in the position para to the nitrogen atom, and R₁ represents a hydrocarbon radical.

5. A new class of compounds represented by the formula:

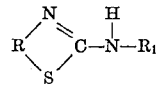

wherein R represents a benzene nucleus having a fluorine atom substituted for hydrogen in the position para to the nitrogen atom, and R₁ represents an aromatic hydrocarbon radical of the benzene or naphthalene series.

6. A new class of compounds represented by the formula:

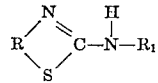

wherein R represents a benzene nucleus having a fluorine atom substituted for hydrogen in the position para to the nitrogen atom, and R₁ represents an aromatic hydrocarbon radical of the benzene series.

7. A class of compounds represented by the general formula

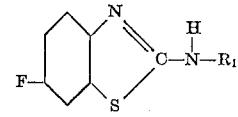

wherein R₁ represents hydrogen or a hydrocarbon radical selected from the group consisting of lower alkyl, aralkyl and aryl.

HERBERT AUGUST LUBS.
ARTHUR LAWRENCE FOX.